United States Patent
Kambe et al.

[11] Patent Number: 5,957,546
[45] Date of Patent: Sep. 28, 1999

[54] HYDRAULIC BRAKING PRESSURE CONTROL DEVICE

[75] Inventors: Norihito Kambe, Kariya; Hiromu Kuromitsu, Chiryu, both of Japan

[73] Assignee: Aisin Seiki Kabushiki Kaisha, Kariya, Japan

[21] Appl. No.: 08/819,470

[22] Filed: Mar. 17, 1997

[30] Foreign Application Priority Data

Mar. 21, 1996 [JP] Japan .................................... 8-064605

[51] Int. Cl.$^6$ .................................................. B60T 13/00
[52] U.S. Cl. ............................ 303/116.4; 303/119.3; 303/DIG. 10
[58] Field of Search ........................... 303/116.4, 113.1, 303/119.2, 119.3, DIG. 10

[56] References Cited

U.S. PATENT DOCUMENTS

| | | | |
|---|---|---|---|
| 4,568,131 | 2/1986 | Blomberg et al. | 303/116.4 |
| 5,281,013 | 1/1994 | Pichon et al. | 303/116.4 |
| 5,362,137 | 11/1994 | Kohno | 303/116.4 |
| 5,529,389 | 6/1996 | Sekiguchi | 303/116.4 |

FOREIGN PATENT DOCUMENTS 4-212663  8/1992  Japan .

*Primary Examiner*—Matthew C. Graham
*Attorney, Agent, or Firm*—Burns, Doane, Swecker & Mathis, LLP

[57] ABSTRACT

A hydraulic braking pressure control device for a hydraulic braking system that includes a wheel brake cylinder operatively connected to a wheel of a vehicle for applying braking force to the cylinder and a master cylinder for generating hydraulic pressure in response to depression of a brake pedal and for supplying the hydraulic pressure to the wheel brake cylinder. In the hydraulic braking pressure control device, a solenoid valve is provided for controlling the hydraulic pressure in the wheel brake cylinder. A pump is connected to the wheel brake cylinder and is disposed in a pump body. The pump is driven by a motor which is disposed in a motor casing. The motor casing is connected to a face of the pump body and the solenoid valve is disposed in the motor casing.

10 Claims, 4 Drawing Sheets

HYDRAULIC BRAKING PRESSURE CONTROL DEVICE

FIELD OF THE INVENTION

The present invention generally relates to a hydraulic braking system. More particularly, the present invention pertains to a brake pressure control device for controlling the hydraulic pressure in a wheel brake cylinder to prevent the wheel from being locked when the brake pedal is depressed.

BACKGROUND OF THE INVENTION

A conventional hydraulic braking pressure control device is disclosed in Japanese Patent Laid-Open Publication No. 4-212663 published on Aug. 4, 1992. In this hydraulic braking pressure control device, the master cylinder is connected to the wheel brake cylinder via a normally open solenoid valve. The wheel brake cylinder is connected via a normally closed solenoid valve to a reservoir storing brake fluid discharged from the wheel brake cylinder. The solenoid valves are provided for controlling the hydraulic pressure in the wheel brake cylinder. A pump is connected to the reservoir and the master cylinder to draw the brake fluid in the reservoir and pump it toward the master cylinder. The pump is driven by a motor.

The pump is disposed in a pump body that possesses a shape in the form of a rectangular prism. The motor is disposed in a motor casing connected to a face of the pump body. The solenoid valves are disposed outside the motor casing and are connected to the same face of the pump body as the motor casing.

However, since the solenoid valves are disposed outside the motor casing, the hydraulic braking pressure control device is large. Further, since the solenoid valves and the motor casing having the motor therein are connected to the same face of the pump body, the width of the pump body is longer than the width (diameter) of the motor casing, and this makes the device even larger.

SUMMARY OF THE INVENTION

A need exists, therefore, for a hydraulic braking pressure control device which addresses at least the foregoing drawbacks associated with other known control devices.

According to one aspect of the present invention, a hydraulic braking pressure control device is provided for a hydraulic braking system that includes a wheel brake cylinder operatively connected to a wheel of a vehicle for applying a braking force to the wheel and a master cylinder which generates hydraulic pressure in response to depression of a brake pedal and supplies the hydraulic pressure to the wheel brake cylinder. The hydraulic braking pressure control device includes a solenoid valve for controlling the hydraulic pressure in the wheel brake cylinder and a pump adapted to be connected to the wheel brake cylinder. The pump is positioned in a pump body and is driven by a motor. The motor is disposed in a motor casing that is connected to a face of the pump body. The solenoid valve is also disposed in the motor casing.

According to another aspect of the present invention, the hydraulic braking pressure control device for a hydraulic braking system includes a pump connectable to the wheel brake cylinders, a motor operatively connected to the pump for driving the pump, and a plurality of solenoid valves for controlling hydraulic pressure in the wheel brake cylinders. The solenoid valves are in fluid communication with the pump. A motor casing is provided in which are housed both the solenoid valves and the motor.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
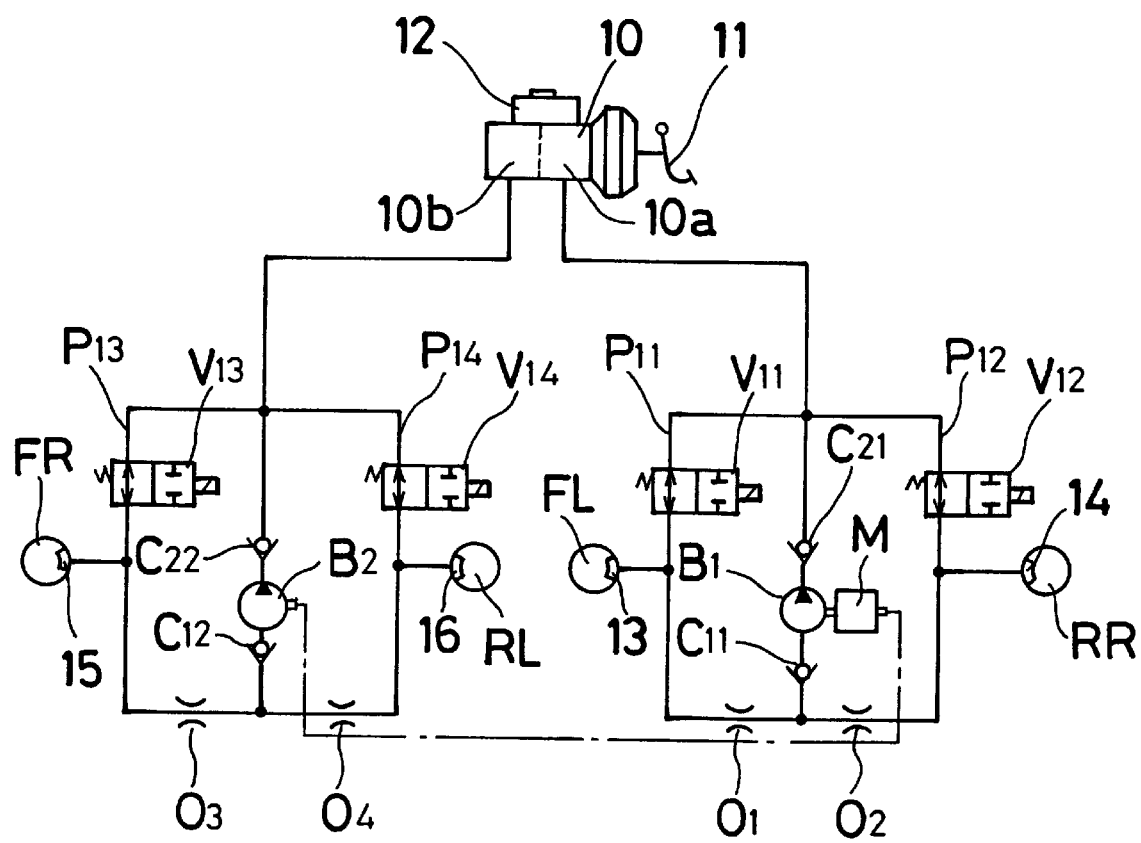
FIG. 1 is a block diagram schematically illustrating a hydraulic braking system having a hydraulic braking pressure control device according to an embodiment of the present invention.

A hydraulic braking system provided with a pressure control device according to an embodiment of the present invention is illustrated in FIG. 1.

The hydraulic braking system includes a tandem master cylinder 10 that is connected to a brake pedal 11. The master cylinder 10 includes a pair of pressure chambers 10a, 10b connected to a master reservoir 12 which stores brake fluid. The master cylinder 10 generates hydraulic pressure in response to depression of the brake pedal 11.

One of the pressure chambers 10a of the master cylinder 10 is connected to a front left wheel brake cylinder 13 and a rear right wheel brake cylinder 14 via respective main conduits P11, P12. The front left wheel brake cylinder 13 is operatively connected to a front left wheel FL corresponding to one of the driven wheels and the rear right wheel brake cylinder 14 is operatively connected to a rear right wheel RR corresponding to one of the non-driven wheels to apply a braking force to the corresponding wheels FL, RR. Normally open solenoid valves V11, V12 are disposed in the respective main conduits P11, P12 to control the hydraulic pressure supplied from the master cylinder 10 to the respective wheel brake cylinders 13, 14.

The inlet of a hydraulic pressure pump B1 is connected to the wheel brake cylinders 13, 14 via a suction valve C11 and respective throttles 01, 02. The outlet of the hydraulic pressure pump B1 is connected to the respective main conduits P11, P12 between the master cylinder 10 and the respective solenoid valves V11, V12 via a discharge valve C21. The pump B1 draws brake fluid from the wheel brake cylinders 13, 14 and pumps the brake fluid toward the master cylinder 10. The pump B1 is driven by a motor M.

The other pressure chamber 10b of the master cylinder 10 is connected to a front right wheel brake cylinder 15 and a rear left wheel brake cylinder 16 via respective main conduits P13, P14. The front right wheel brake cylinder 15 is operatively connected to a front right wheel FR corresponding to the other one of the driven wheels and the rear left wheel brake cylinder 16 is operatively corrected to a rear left wheel RL corresponding to the other one of the nondriven wheels to apply a braking force to the corresponding wheels FR, RL, respectively. Normally open solenoid valves V13, V14 are disposed in the respective main conduits P13, P14 to control the hydraulic pressure supplied from the master cylinder to the respective wheel brake cylinders 15, 16.

The inlet of a hydraulic pressure pump B2 is connected to the wheel brake cylinders 15, 16 via a suction valve C12 and respective throttles O3, O4. The outlet of the hydraulic pressure pump B2 is connected to the respective main conduits P13, P14 between the master cylinder 10 and the respective solenoid valves V13, V14 via discharge valve C22. The pump B2 draws brake fluid from the wheel brake cylinders 15, 16 and pumps the brake fluid toward the master cylinder 10. The pump B2 is also driven by the same motor M that drives the pump B1.

The operation of the hydraulic braking system is as follows. When the brake pedal 11 is depressed by a driver, the master cylinder 10 generates hydraulic pressure. The hydraulic pressure generated by the master cylinder 10 is supplied to the wheel brake cylinders 13, 14 via the respective main conduits P11, P12, so that a braking force is applied to the wheels FL, RR. On the other hand, when the brake pedal 11 is released, the hydraulic pressure in the pressure chamber 10a of the master cylinder 10 is decreased. As a result, the brake fluid in the wheel brake cylinders 13, 14 is returned to the master cylinder 10.

When the slip rate of the front left wheel FL exceeds a first threshold value during depression of the brake pedal 11, i.e., the front left wheel FL tends to be locked, the motor M is operated to drive the pump B1 and the solenoid valve V11 is closed by the electronic controller (not shown). As a result, the pump B1 draws the brake fluid from the wheel brake cylinder 13 via the throttle O1 and discharges the pressurized brake fluid to the main conduit P11 between the master cylinder 10 and the closing solenoid valve V11. Thus, the hydraulic pressure in the wheel brake cylinder 13 is decreased.

On the other hand, when the slip rate of the front left wheel FL is lower than a second threshold value which is lower than the first threshold value, the solenoid valve V11 is opened by the electronic controller while the motor M is operated. As a result, the hydraulic pressure of the master cylinder 10 is supplied to the wheel brake cylinder 13. At the same time, the brake fluid in the wheel brake cylinder 13 is drawn by the pump B1 via the throttle O1. The quantity of brake fluid discharged from the wheel brake cylinder 13 is smaller than quantity of brake fluid supplied to the wheel brake cylinder 13 due to the throttle O1. Thus, the hydraulic pressure in the wheel brake cylinder 13 is increased.

As mentioned above, the anti-skid control can be carried out by opening/closing the solenoid valve V11 while the pump B1 is operated.

Figure 4:
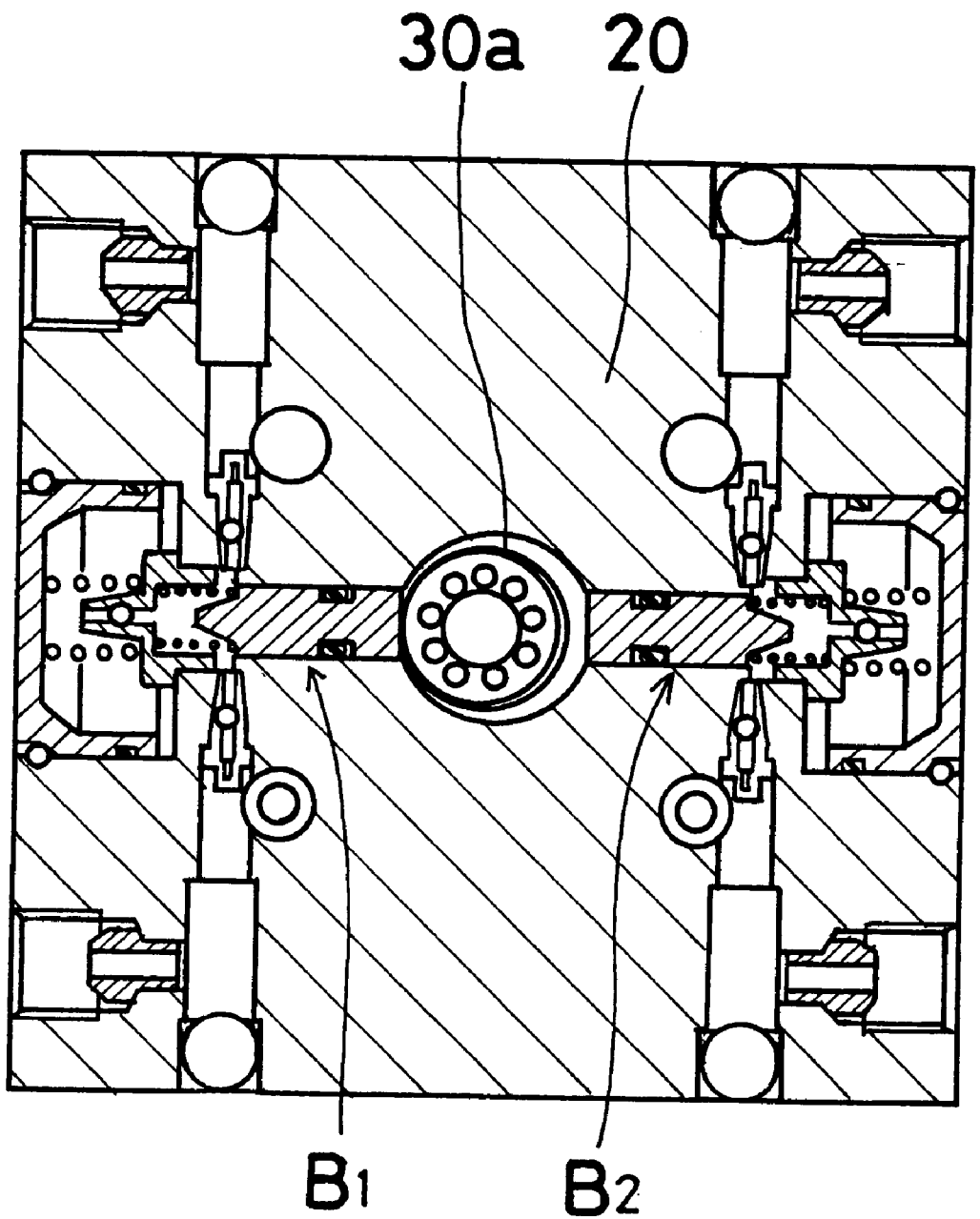
FIG. 4 is a cross-sectional view of the hydraulic braking pressure control device taken along the section line 4—4 in FIG. 2.

Turning to FIG. 4, the pumps B1, B2 are plunger pumps. Each of the pumps B1, B2 is disposed in a pump body 20 having a shape such as a rectangular prism. The pumps B1, B2 are positioned in opposing relation to each other and are driven by the rotation of an eccentric portion 30a provided in one end of an output shaft 30 (see FIG. 2) of the motor M.

Figure 2:
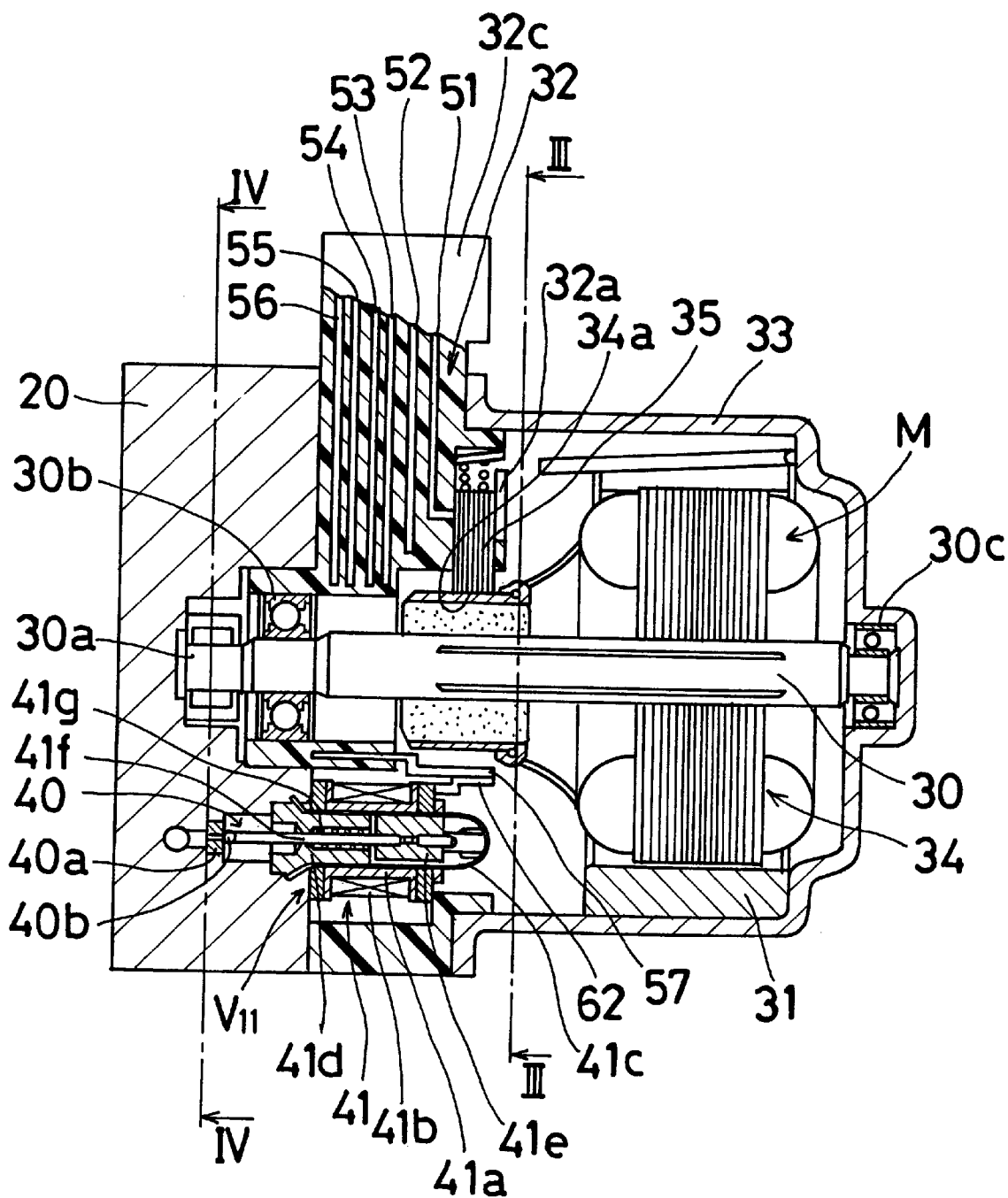
FIG. 2 is a cross-sectional view of the hydraulic braking pressure control device according to an embodiment of the present invention.

As shown in FIG. 2, a first motor casing 32 made of a resin material is fixed to the rightside face of the pump body 20 and a cylindrical second motor casing 33 is fixed to a rightside face of the first motor casing 32. The motor M is a DC motor which includes a pair of stators 31 (only one of which is shown in FIG. 2), a rotor 34, the output shaft 30 and a pair of brushes 35, 36. The stator 31 is fixed to an inner face of the second motor casing 33 and is formed by a permanent magnet. The rotor 34 is rotatably disposed inside the stator 31 and is fixed to the output shaft 30. The rotor 34 includes a commutator 34a.

Figure 3:
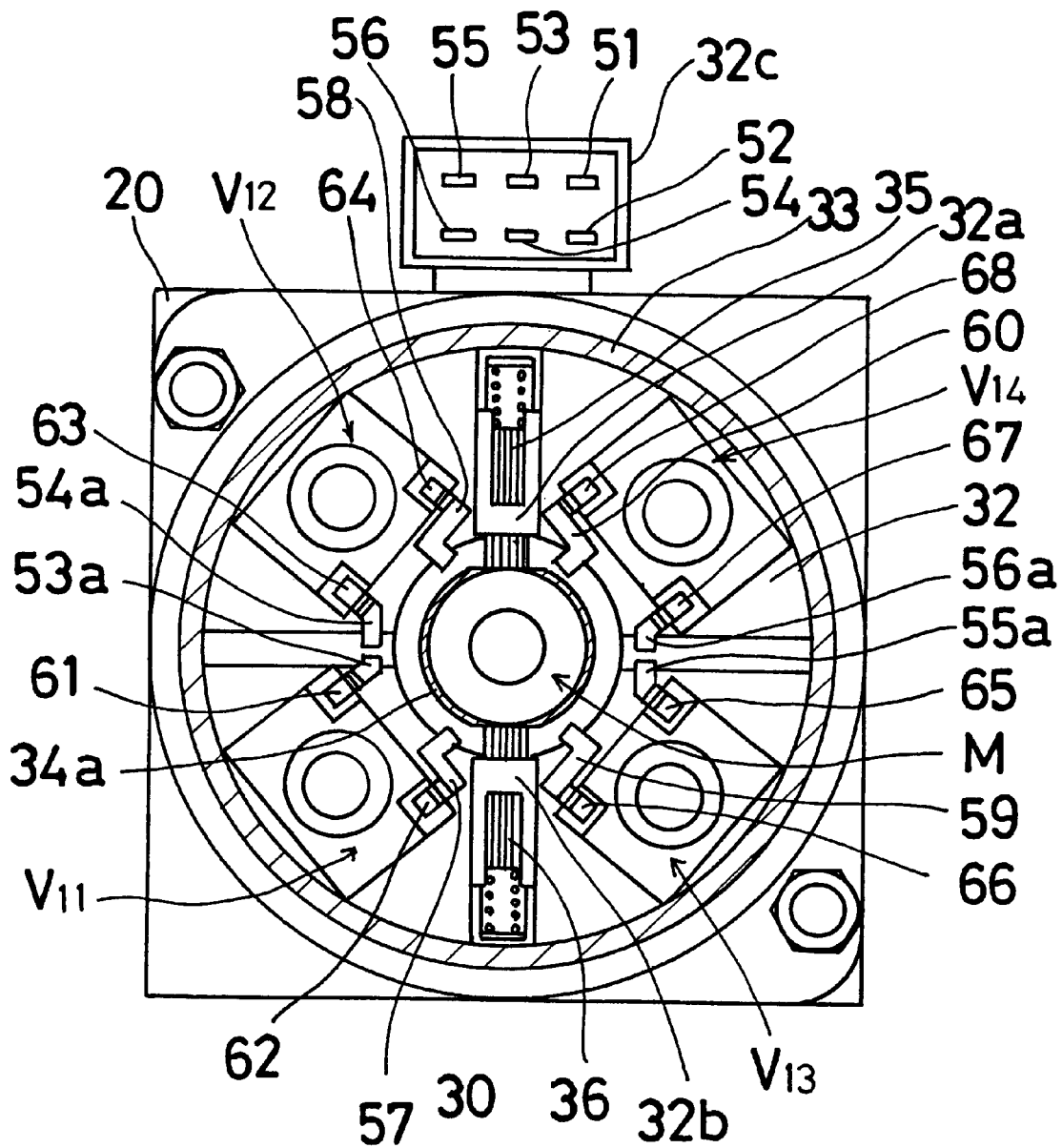
FIG. 3 is a cross-sectional view of the hydraulic braking pressure control device taken along the section line 3—3 in FIG. 2.

The output shaft 30 is rotatably supported by the first and second motor casings 32, 33 via a pair of bearings 30b, 30c. The output shaft 30 extends in an axial direction of the second motor casing 33. A pair of supporting portions 32a, 32b (one of the supporting portions 32a is shown in FIGS. 2 and 3, and the other supporting portion 32b is shown in FIG. 3) are integrally formed with the first motor casing 32. The brushes 35, 36 are supported by the supporting portions 32a, 32b, respectively. The brushes 35, 36 are located around the commutator 34a of the rotor 34 and are electrically connected to the commutator 34a.

As shown in FIGS. 2 and 3, the solenoid valves V11, V12, V13, V14 are disposed in the first motor casing 32 and the pump body 20. The solenoid valves V11, V12, V13, V14 are located around the output shaft 30 of the motor M and are arranged in a concentric circle which is coaxial with the output shaft 30. The solenoid valve V11 includes a valve member 40 for opening/closing the main conduit P11 and a solenoid 41 for operating the valve member 40. The valve member 40 is disposed in the pump body 20. The valve member 40 includes a valve seat 40a fixed to the pump body 20 and a slidable valve body 40b engageable with the valve seat 40a. The solenoid 41 is disposed in the first motor casing 32.

The solenoid 41 includes a cylindrical bobbin 41a, a coil 41b, a bottomed sleeve 41c, a stationary core 41d, a movable core 41e, a rod 41f and a coil spring 41g. The coil 41b is wound around the bobbin 41a. The sleeve 41c is disposed inside the bobbin 41a and has an open end that is fixed to the pump body 20. The stationary core 41d is disposed in the sleeve 41c and one end of the stationary core 41d is fixed to the pump body 20. The movable core 41e is movably disposed in the sleeve 41c. The movable core 41e is opposed to the stationary core 41d to form a magnetic gap with the opposing end of the stationary core 41d. One end of the rod 41f is fixed to the movable core 41e to be movable with the movable core 41e and the other end of the rod 41f is provided with the valve body 40b. The coil spring 41g is disposed between the stationary core 41d and the movable core 41e to bias the movable core 41e in a direction away from the stationary core 41d.

Each of the other solenoid valves V12, V13, V14 also includes a valve member disposed in the pump body 20 and a solenoid disposed in the first motor casing 32. The detailed construction of each of the other solenoid valves V12, V13, V14 is similar to the construction of the solenoid valve V11 described above and so a detailed description of those solenoid valves V12, V13, V14 is not repeated here.

A motor input terminal 51 is provided in the first motor casing 32. Also provided in the first motor casing 32 are a common output terminal 52 for the motor M and the four solenoid valves V11, V12, V13, V14, a first solenoid input terminal 53 for the solenoid valve V11, a second solenoid input terminal 54 for the solenoid V12, a third solenoid input terminal 55 for the solenoid valve V13, and a fourth solenoid input terminal 56 for the solenoid valve V14.

A connector 32c is integrally formed with the first motor casing 32. One end of each of the motor input terminal 51, the common output terminal 52 and the solenoid input terminals 53, 54, 55 to 56 is collected in the connector 32c and electrically connected to the electronic controller. The opposite end of the motor input terminal 51 is electrically connected to one of the brushes 35 of the motor M. The opposite end of the common output terminal 52 is electrically connected to the other brush 36. Also, the opposite end of the common output terminal 52 is electrically connected to one end 62, 64, 66, 68 (shown in FIG. 3) of each of the coils (e.g., 41b) via respective terminals 57, 58, 59, 60 (shown in FIG. 3). The terminals 57, 58, 59, 60 are connected to the one end 62, 64, 66, 68 of the respective coils by welding. The opposite ends 53a, 54a, 55a, 56a of the solenoid input terminals 53, 54, 55, 56 are electrically connected to the other end 61, 63, 65, 67 of the respective coils (e.g., 41b) by welding. The terminals 51–60 are formed with the first motor casing 32 by insert molding.

In this embodiment, since the four solenoid valves V11, V12, V13, V14 are disposed in the motor casing 32, 33 and the pump body 20, surplus space in the motor casing 32, 33 and the pump body 20 can be used effectively. As a result, the device can be made smaller than conventional devices in which the solenoid valves are disposed outside the motor casing.

Further, since the solenoid valves are disposed in the surplus space within the motor casing 32, 33 and the pump body 20, the width of the pump body 20 in the radial direction of the outer shaft 30 can be substantially equal to the width of the motor casing 32, 33. In this way, the width of the pump body 20 is smaller than that in conventional control devices. Therefore, the control device can be made even smaller.

Further, since the pair of terminals 51, 52 for energizing the motor M and the pairs of terminals 53, 52; 54, 52; 55, 52; 56, 52 for energizing the respective solenoids 41 are formed with the first motor casing 32, it is possible to make the device further smaller. Also, because one end of each of the terminals 51–56 is collected in the connector 32c integrally formed with the first motor casing 32, it is easy to electrically connect the terminals 51–56 to the electronic controller.

In this embodiment, although the brake fluid in the wheel brake cylinders 13–16 is described as being directly drawn by the pumps B1, B2, the present invention may be applied to a type in which the wheel brake cylinders 13, 14 are connected to a reservoir via respective normally closed solenoid valves and the brake fluid in the reservoir is drawn by the pump B1.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic braking pressure control device for a hydraulic braking system that includes a wheel brake cylinder operatively connected to a wheel of a vehicle for applying braking force thereto and a master cylinder for generating hydraulic pressure in response to depression of a brake pedal and for supplying the hydraulic pressure to the wheel brake cylinder, the hydraulic braking pressure control device comprising:

a pump connectable to at least the wheel brake cylinder;
a pump body in which is positioned the pump;
a motor for driving the pump, the pump including a stator having a diameter; and a solenoid valve disposed within the diameter of the stator for controlling the hydraulic pressure to be supplied to the wheel brake cylinder, the solenoid valve including a valve member and a solenoid for operating the valve member, the solenoid being disposed in the motor casing and the valve member being disposed in the pump body.

2. A hydraulic braking pressure control device for a hydraulic braking system that includes a wheel brake cylinder operatively connected to a wheel of a vehicle for applying braking force thereto and a master cylinder for generating hydraulic pressure in response to depression of a brake pedal and for supplying the hydraulic pressure to the wheel brake cylinder, the hydraulic braking pressure control device comprising:

a pump connectable to at least the wheel brake cylinder;
a pump body in which is positioned the pump;
a motor for driving the pump, the pump including a stator having a diameter;
a solenoid valve disposed within the diameter of the stator for controlling the hydraulic pressure to be supplied to the wheel brake cylinder; and
a motor casing connected to a face of the pump body, the motor being disposed in the motor casing, the motor casing including a first motor casing portion connected to the pump body and a second motor casing portion connected to the first motor casing, the solenoid valve being positioned in the first motor casing portion.

3. A hydraulic braking pressure control device according to claim 2, further including a pair of first terminals for energizing the motor and a pair of second terminals for energizing a solenoid forming a part of the solenoid valve, the first and second terminals being provided in the first motor casing portion.

4. A hydraulic braking pressure control device according to claim 3, wherein the first motor casing portion is made of resin material, and the first and second terminals are formed as a part of the first motor casing portion by insert molding.

5. A hydraulic braking pressure control device according to claim 4, further including a connector integrally formed with the first motor casing portion, one end of each of the first and second terminals being provided in the connector.

6. A hydraulic braking pressure control device for a hydraulic braking system that includes wheel brake cylinders operatively connected to respective wheels of a vehicle for applying a braking force to the wheels and a master cylinder for generating hydraulic pressure in response to depression of a brake pedal to supply hydraulic pressure to the wheel brake cylinders, the hydraulic braking pressure control device comprising:

a pump connectable to the wheel brake cylinders, the pump being disposed in a pump body;
a motor operatively connected to the pump for driving the pump;
a plurality of solenoid valves for controlling hydraulic pressure in the wheel brake cylinders, the solenoid valves being in fluid communication with the pump;
a motor casing which houses both the solenoid valves and the motor; and
each solenoid valve including a valve member and a solenoid for operating the valve member, the solenoid being disposed in the motor casing and the valve member being disposed in the pump body.

7. A hydraulic braking pressure control device according to claim 6, wherein the motor casing includes a first motor casing portion and a second motor casing portion, the pump body being fixed to one face of the first motor casing portion.

8. A hydraulic braking pressure control device according to claim 6, including a plurality of pairs of terminals for energizing respective solenoid valves, the plurality of pairs of terminals being formed integrally with the motor casing.

9. A hydraulic braking pressure control device for a hydraulic braking system that includes wheel brake cylinders operatively connected to respective wheels of a vehicle for applying a braking force to the wheels and a master cylinder for generating hydraulic pressure in response to depression of a brake pedal to supply hydraulic pressure to the wheel brake cylinders, the hydraulic braking pressure control device comprising:

a pump connectable to the wheel brake cylinders;

a motor operatively connected to the pump for driving the pump;

a plurality of solenoid valves for controlling hydraulic pressure in the wheel brake cylinders, the solenoid valves being in fluid communication with the pump;

a motor casing which houses both the solenoid valves and the motor; and a pair of first terminals for energizing the motor and a plurality of pairs of second terminals for energizing respective solenoid valves, and a connector integrally formed in one piece with the motor casing, one end of each of the first and second pairs of terminals being disposed in the connector.

10. A hydraulic braking pressure control device according to claim 9, wherein the motor casing includes a first motor casing portion and a second motor casing portion, the first motor casing portion being made of resin material.

* * * * *